US005779083A

United States Patent [19]

Bordwell

[11] Patent Number: 5,779,083

[45] Date of Patent: Jul. 14, 1998

[54] ELECTRICAL RECEPTACLE COVER ASSEMBLY INCLUDING DUAL ACTING SPRING

[75] Inventor: Mark Bordwell, Memphis, Tenn.

[73] Assignee: Thomas & Betts Corporation, Memphis, Tenn.

[21] Appl. No.: 624,060

[22] Filed: Mar. 29, 1996

Related U.S. Application Data

[63] Continuation of Ser. No. 201,538, Feb. 25, 1994, abandoned.

[51] Int. Cl.$^6$ .................. H02G 3/14

[52] U.S. Cl. .................. 220/242; 174/67; 220/341; 220/342; 220/3.8

[58] Field of Search .................. 220/242, 241, 220/337, 342, 3.8; 174/67, 66

[56] References Cited

U.S. PATENT DOCUMENTS 2,867,345 1/1959 Bellek .
2,870,933 1/1959 Winter .
2,905,356 9/1959 Jerome .
2,978,978 4/1961 Lang .
2,985,334 5/1961 Slater .
2,987,214 6/1961 Radack .
3,204,807 9/1965 Ramsing .
3,252,611 5/1966 Weitzman et al. .
4,058,358 11/1977 Carlisle .
4,381,063 4/1983 Leong .
4,505,403 3/1985 Bowden, Jr. et al. .
5,430,253 7/1995 Pratt .

*Primary Examiner*—Allan N. Shoap
*Assistant Examiner*—Robin A. Hylton
*Attorney, Agent, or Firm*—Michael L. Hoelter; Salvatore J. Abbruzzese

[57] ABSTRACT

An electrical receptacle cover assembly provides weather-tight closure of a receptacle outlet. The cover assembly includes a faceplate mountable over an electrical receptacle. The faceplate includes an opening for exposing an outlet of the receptacle. A cover is hingedly attached to the faceplate for closing the opening. A spring is positioned between the cover and the faceplate and supports the cover in a normally closed position. The spring includes a leaf spring portion and a cantilevered spring portion each independently deflectable to permit repeated closure of the cover.

21 Claims, 4 Drawing Sheets

ELECTRICAL RECEPTACLE COVER ASSEMBLY INCLUDING DUAL ACTING SPRING

This application is a continuation of application Ser. No. 08/201,538, filed on Feb. 25, 1994, abandoned.

FIELD OF THE INVENTION

The present invention relates generally to an electrical receptacle cover assembly. More particularly the present invention relates to a receptacle cover assembly where the cover is mounted to the assembly for movement under the bias of an improved spring.

BACKGROUND OF THE INVENTION

A conventional electrical receptacle assembly includes an electrical receptacle which may be of the duplex variety having a pair of receptacle outlets. The receptacle is supported within an open-faced receptacle housing. The open-face of the housing is closed by an outlet cover assembly. The cover assembly may include a faceplate having a pair of openings alignable with the outlets on the duplex receptacle and, in outdoor environments, would have a pair of covers closing the openings in the faceplate. The faceplate as well as the individual covers may include gasketing material to provide a weather-tight seal.

In outdoor environments in order to maintain such weather-tight seal when an individual receptacle outlet is not being employed, the cover is maintained in a closed position over the faceplate opening by a spring mounted between the cover and the faceplate. The cover is manually openable against the bias of the spring so that an electrical plug can be inserted or removed from the receptacle outlet. Once the cover is released, it will spring back against the faceplate opening, closing the opening and protecting the receptacle outlet. As weatherproof outlets of this type are typically employed in adverse conditions, a relatively stiff spring is used so that the cover is strongly biased against the faceplate opening in closed position.

The art has seen several variations of springs interposed between the cover and the faceplate to hingedly support the cover to the faceplate. One type of spring employed is a torsion spring consisting of a cylindrical coil spring having ends thereof extending transversely outwardly from the cylindrical coil. One end would be attached to the faceplate while the other end would be attached to the cover. Opening the cover against the bias of the torsion spring would force the ends apart. Upon release of the cover, the spring would return to its normal position, snapping the cover closed.

A second spring which is employed in combination with electrical receptacle cover assemblies is a simple leaf spring. The leaf spring in combination with structure on the cover plate, is designed to hold the cover closed. Upon opening the cover the leaf spring is deformed from a normally arched position to a relatively flat position. Release of the cover would enable the leaf spring to spring back to its original arched position thereby snapping the cover shut over the faceplate opening.

In each situation, as the springs must exhibit a high degree of spring tension in order to securely close the cover over the opening, there is a tendency through repeated use for the springs to lose their spring characteristics. That is, through use, the springs may permanently deform rendering the spring useless as it would fail to tightly close the cover over the faceplate opening. This is especially true with the use of a leaf spring where in order to maintain a tight closure of the cover with respect to the faceplate, a relatively high arch must be employed. A leaf spring so constructed would have a tendency after repeated use to somewhat permanently flatten, reducing its spring effectiveness. Significant reduction in the spring effectiveness would result in the electrical receptacle cover assembly no longer being weather-tight.

SUMMARY OF THE INVENTION

It is an object of the present invention to provide an electrical receptacle cover assembly which provides for weather-tight closure of a cover over an opening in a faceplate and which is capable of repeated use.

It is a further object of the present invention to provide an improved spring which permits movable support of a cover with respect to a cover faceplate and which maintains the cover in closed position over the faceplate.

It is a still further object of the present invention to provide an improved spring positioned between a cover and a faceplate of an electrical receptacle cover assembly which permits repeated use without suffering significant spring degradation.

In the efficient attainment of these and other objects, the present invention provides an electrical receptacle cover assembly including a faceplate mountable over an electrical receptacle. The faceplate includes an opening therethrough for exposing an outlet of the electrical receptacle. A cover is hingedly attached to the faceplate for closing the opening. A spring is positioned on the faceplate adjacent the opening. The faceplate includes a spring retainer for supporting the spring. The spring further includes a leaf spring element removably supported within the spring retainer and a cantilevered spring element extending from the leaf spring element toward and engagable with the cover. The leaf spring element and the cantilevered spring element are each independently spring deformable to permit movement of the cover between an open position and a closed position with respect to the opening.

As more particularly described with respect to the preferred embodiment herein, the electrical receptacle cover assembly of the present invention includes the cover having a spring engaging portion for engagement with the cantilevered spring element. The spring engaging portion includes a first location engagable with the cantilevered spring in the closed position and a second location spaced from the first location engagable with the cantilevered spring in the open position. The first and second locations are relatively positioned so that the cover will be maintained in a normally closed position.

DETAILED DESCRIPTION OF THE PREFERRED EMBODIMENTS

Figure 1:
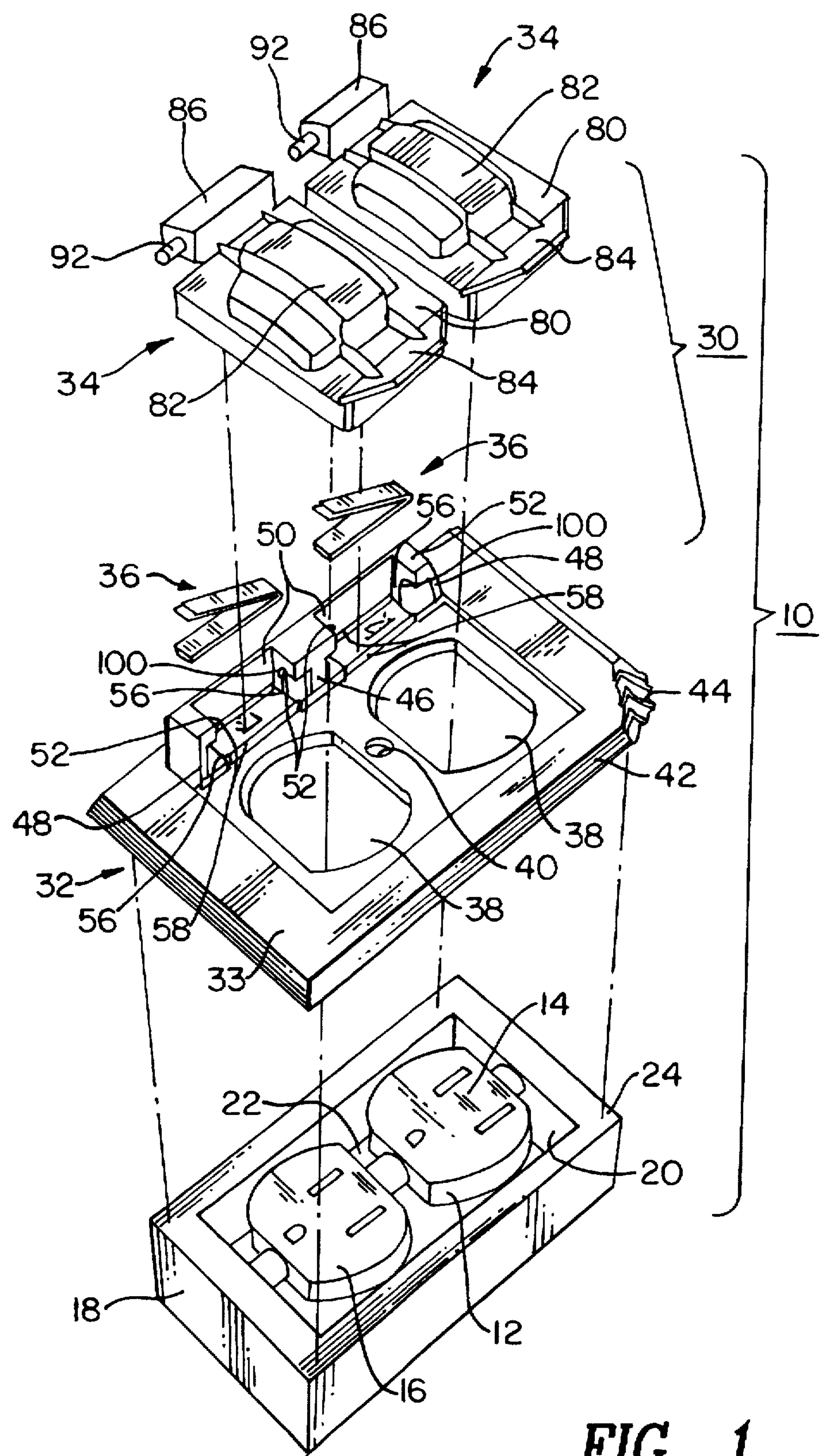
FIG. 1 shows an exploded perspective view of an electrical receptacle housing and a receptacle cover assembly of the present invention.

Referring to FIG. 1, an outdoor weather-tight electrical receptacle assembly 10 is shown. Receptacle assembly 10 is of the type which is typically used outdoors to permit removable connection of an electrical cord (not shown) in conventional fashion. Receptacle assembly 10 has numerous uses, both in a commercial and residential setting and may be used in any environment where outdoor electrical connection is desired. Receptacle assembly 10 may take several forms and shapes depending on the particular application. The specific shape shown in FIG. 1 is one of the many types which may be employed in accordance with the present invention.

Receptacle assembly 10 generally includes an electrical receptacle 12 which may be a conventional duplex receptacle having a pair of electrical outlets 14 and 16 spaced in traditional upper and lower fashion. Outlets 14 and 16 are designed for terminating a two or three prong conventional electrical cord (not shown).

Electrical receptacle 12 is supported in a receptacle housing 18. Housing 18 is generally of a rectangular box-like construction having an open face 20 and an internal chamber 22 which supports the receptacle 12 therein. Receptacle 12 may be supported in housing 18 using screws or other fastening means as is well known in the connection art. Outlets 14 and 16 of receptacle 12 are positioned along the open face 20 of housing 18 to provide connection access thereto. Housing 18 defines a perimetrical ledge 24 therearound coplanar with open face 20 which, as will be described in further detail hereinbelow, serves as a support surface.

Positioned for removable mounting over open face 20 of housing 18 is a cover assembly 30. Cover assembly 30 is a multi-component device including a generally planar faceplate 32, a pair of covers or lids 34 and a pair of mounting springs 36 interposed between lids 34 and faceplate 32.

Faceplate 32 is a flat rectangular member having a pair of upper and lower faceplate openings 38 which are positioned to overlie outlets 14 and 16 of receptacle 12 thereby exposing the outlets for electrical connection. Faceplate 32 is designed to be secured to receptacle 12 and housing 18 by means of a centrally located screw aperture 40 positioned between faceplate openings 38. Faceplate 32 may be secured over the open face 20 of housing 18 with a conventional screw (not shown) through screw aperture 40 and into screw engagement with receptacle 12 which is secured in housing 18. Faceplate 32 includes a perimetrically tapered edge 42 which rests on ledge 24 of housing 18 to support faceplate 32 on housing 18.

As receptacle assembly 10 is designed for outdoor use, a gasket 44 formed of foam rubber or other elastomeric material may be interposed between faceplate 32 and open face 20 of housing 18 to provide a weather-tight seal around receptacle 12.

Figure 2:
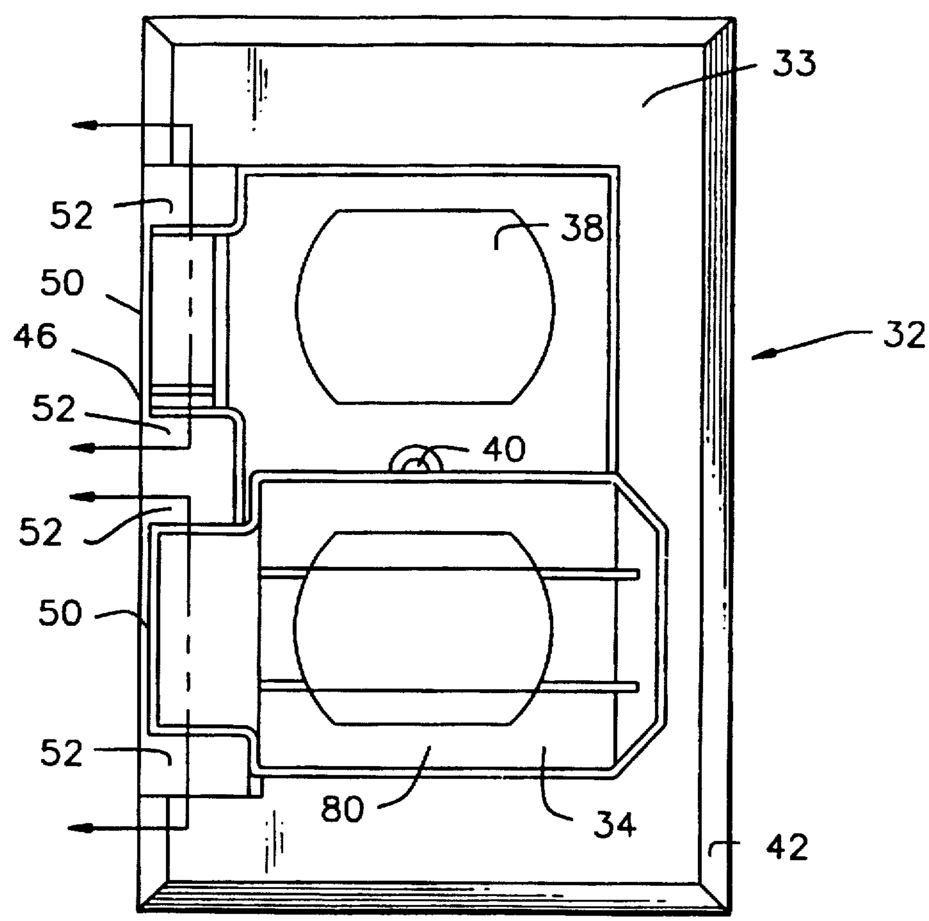
FIG. 2 is a front view of the receptacle cover assembly of FIG. 1.

Referring additionally to FIG. 2, faceplate 32 includes on an upper surface 33 thereof, an upstanding member 46 extending along one longitudinal edge thereof. Upstanding member 46 extends adjacent both faceplate openings 38 for supporting lids 34 over openings 38. Upstanding member 46 is defined by a pair of side-by-side identical lid attachment members 48. Each lid attachment member 48 includes a backwall 50, a pair of spaced apart sidewalls 52 and a bottom trough 54 (FIG. 4) between sidewalls 52. Trough 54 is generally a rectangular member defined by transverse walls 56 generally aligned with sidewalls 52 and longitudinal walls 58. Troughs 54 support springs 36 in position therein as will be described in further detail hereinbelow.

Figure 3:
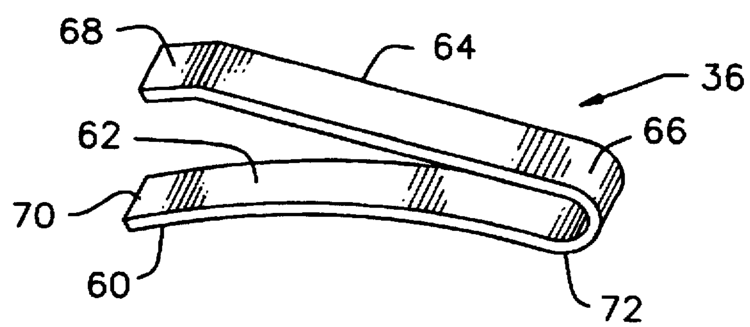
FIG. 3 is a perspective showing of the spring employed with the receptacle cover assembly of the present invention.

Referring additionally to FIG. 3, spring 36 of the present invention may be described. Each spring 36 is generally an elongate member formed of suitable flexible spring metal or similar spring type material. Spring 36 is sufficiently elastic such that after a certain degree of spring deformation, spring 36 will return to its original shape. As shown in FIG. 3, spring 36 is a substantially V-shaped member having two legs, and each leg of the member forms a separate spring portion. One of the legs is defined by a first leaf spring portion 60 having a centrally upwardly arched portion 62. The other leg of the V-shaped member includes an elongate second cantilevered spring portion 64 which extends over leaf spring portion 60. Leaf spring portion 60 is attached to cantilevered spring portion 64 by reversely bent end portion 66 therebetween. The cantilevered spring portion 64, therefore, is attached to spring 36 at only one end. The other end extends outwardly unsupported by spring 36 and is, therefore, free to deflect. Cantilevered spring portion 64 includes a downwardly directed distal end extent 68 which provides for expediency of manufacture and also provides a chamfered end surface which facilitates usage of the spring as will be described in further detail hereinbelow.

Leaf spring portion 60 and cantilevered spring portion 64 both deflect by virtue of their own construction, and are therefore, independently deflectable. That is, the leaf spring portion 60 deflects such that the arched portion 62 is depressed spreading out end 70 and end portion 66. Further, cantilevered spring portion 64 deflects downwardly in conventional cantilevered fashion from reversely bent portion 66. The respective leaf and cantilevered spring portions 60 and 64 may deflect relative to each other by virtue of their own construction either simultaneously or non-simultaneously with respect to the other spring. That is, the cantilevered 64 may deflect to a certain degree prior to the deflection of leaf spring portion 60.

Referring again to FIG. 1, cover 34 includes a main cover portion 80 which is generally planar and includes a raised central crown 82 and an outwardly extending tab 84. Tab 84 permits manual grasping of cover 34 to permit opening and closing of the cover with respect to faceplate 32. The undersurface 81 of cover portion 80 may include a gasket 83 (FIGS. 7 and 8) similar to gasket 44 to provide for weather-tight closure over outlets 14 and 16.

Figure 4:
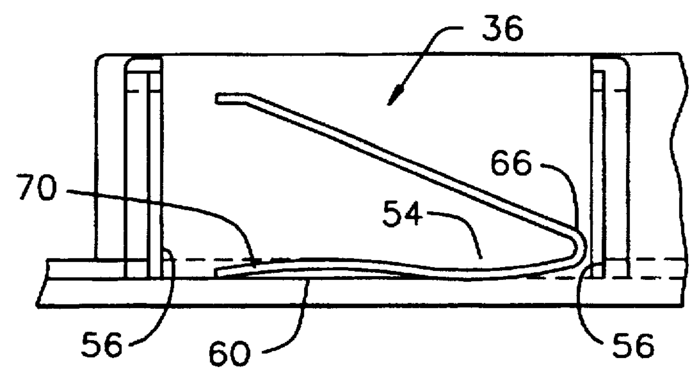
FIG. 4 is a plan view of the receptacle cover assembly of FIG. 2 with the lid shown removed.
Figure 7:
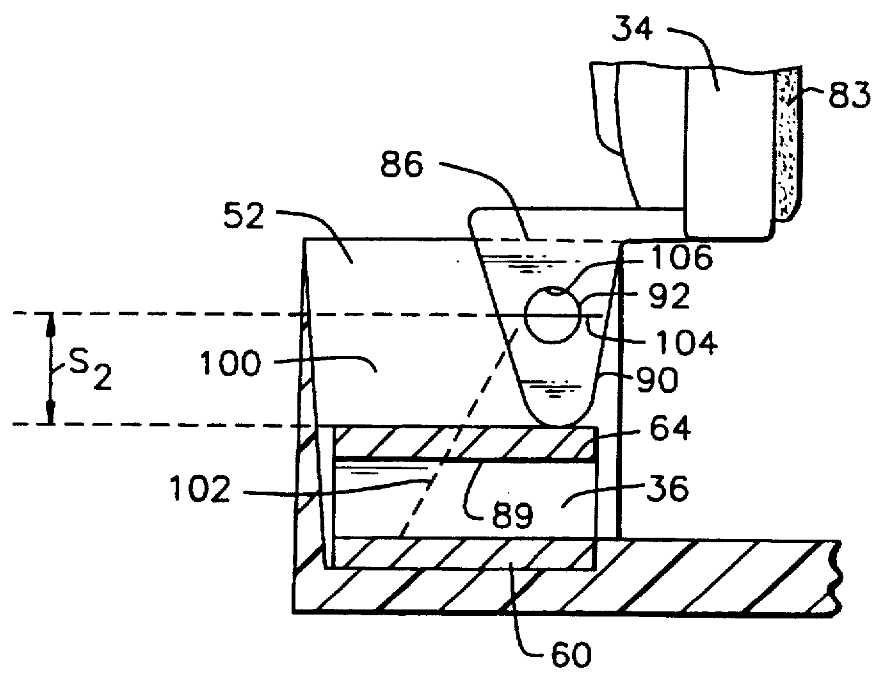
FIGS. 7 and 8 show in partial section, the receptacle cover assembly of FIG. 2 in the open and closed positions, respectively.
Figure 8:
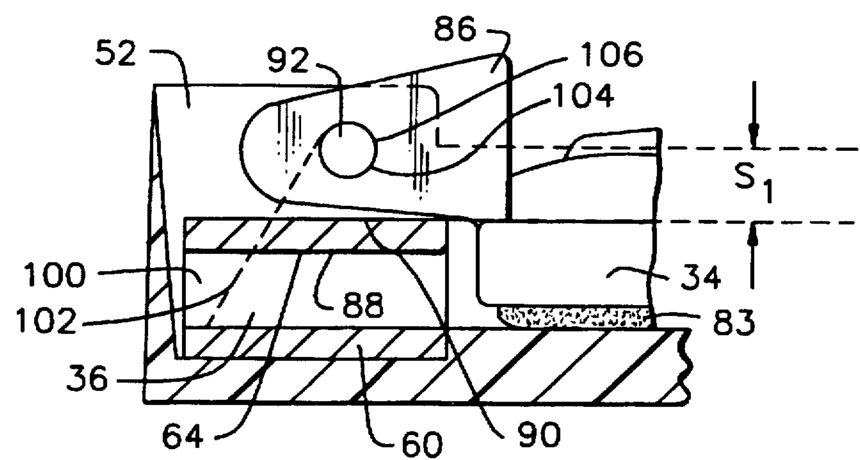

Referring additionally to FIGS. 4, 7 and 8, cover 34 includes a hinge 86 extending from one end thereof. Hinge 86 includes a curved edge surface 90 and a pair of outwardly extending hinge pins 92. Hinge pins 92 are designed to seat within a hinge pin receiving track 100 formed in each sidewall 52 of each attachment member 48. The tracks 100 serve to hingedly support hinge 86 in attachment member 48.

Each hinge pin receiving track 100 is defined by track surface 102 which tapers inwardly toward cover 34. The distal extent 104 of track surface 102 is reversely curved to form a hinge pin seat 106 to rotatably seat hinge pin 92 therein. This seating allows cover 34 to be hingedly rotated within attachment member 48.

Having described the components of receptacle assembly 10, its operation may now be described with reference to the drawings, specifically FIGS. 1 and 4–8. Cover assembly 30 shown in FIG. 1, may be assembled prior to attachment to housing 18. As shown in FIG. 4, each spring 36 may be positioned within each trough 54 of attachment member 48. The longitudinal extent of leaf spring portion 60 is constructed so that it has a dimension less than the longitudinal extent of trough 54 between transverse walls 56. Thus, end 70 as well as reversely bent portion 66 is spaced inwardly from transverse walls 56 of trough 54. As constructed, leaf spring portion 60 is permitted to longitudinally expand upon deflection thereof, such longitudinal expansion being permitted within trough 54.

Figure 5:
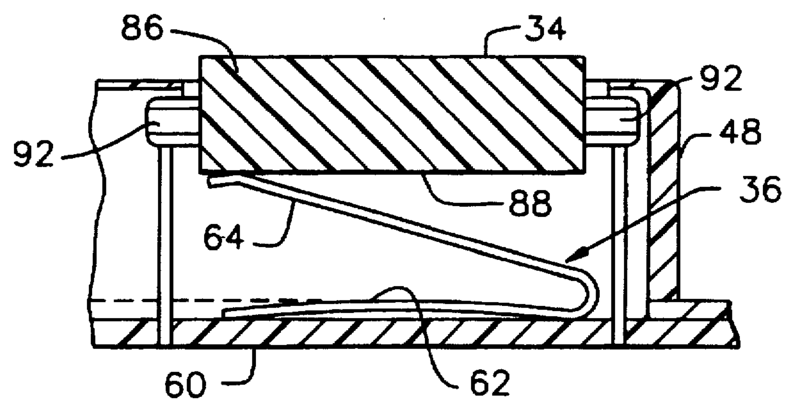
FIG. 5 is a sectional showing of the receptacle cover assembly of FIG. 2 taken through the lines V—V.

With springs 36 positioned within troughs 54, lids 34 may be attached to attachment members 48. Each lid 34 is inserted into attachment member 48 between sidewalls 52 thereof by urging hinge 86 against cantilevered spring portion 64 of spring 32 (FIG. 5). This tends to slightly deflect both leaf spring portion 60 and cantilevered spring portion 64 of spring 36 permitting such insertion of lid 34. Hinge pins 92 ride along track surface 102 becoming seated within seat 106. The spring resiliency of spring 36 forces hinge pins 92 upward along track surface 102 and into seat 106. The spring bias of spring 36 securely holds lid 34 in place. However, lids 34 may be easily removed by forcing each lid 34 downward against spring 36 depressing the spring until hinge pins 92 clear the curved distal extent 104, unseating hinge pins 92 and permitting withdrawal of each lid therefrom.

Figure 6:
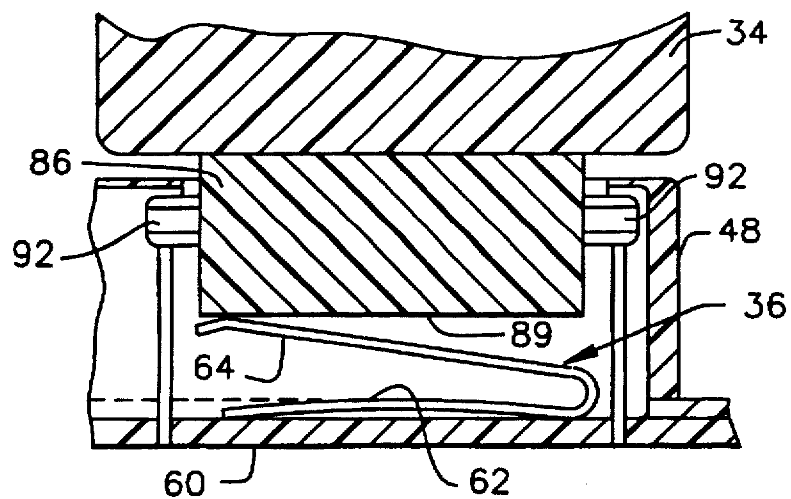
FIG. 6 is a partial sectional showing of the receptacle cover assembly of FIG. 2 taken through the lines VI—VI thereof with the lid shown in place in the open position.

Referring to FIGS. 5–8, hinged movement of each lid 34 between an open and closed position may be described. FIGS. 5 and 8 show lid 34 in a closed position while FIGS. 6 and 7 show lid 34 in an open position. Lid 34 is positioned in a normally closed condition. Spring 36 is partially deflected against the bias thereof by the attachment of lid 34 to attachment member 48. In this condition, leaf spring portion 60 is partially elongated with the arched portion 62 thereof partially deformed. Similarly, cantilevered spring portion 64 is partially deflected downwardly towards leaf spring portion 60. As above mentioned, the resiliency of the spring 36 in the position shown in FIGS. 5 and 8 holds lid 34 to cover attachment member 48.

As shown in FIG. 8, the distance between the center of hinge pin 92 and a first spring engagement surface 88 of hinge 86 is a distance $s_1$. As cover 34 is moved to an open position shown in FIG. 7, a curved second spring engagement surface 89 of hinge 86 engages spring 36. The distance between the center of hinge pin 92 and surface 89 of hinge 88 is a distance $s_2$. Hinge 86 is constructed so that $s_2$ is greater than $s_1$. Thus when cover 34 is moved from a closed position shown in FIGS. 5 and 8 to an open position shown in FIGS. 6 and 7, spring 36 is further deformed against the bias thereof. As especially seen in FIG. 6, leaf spring portion 60 is further elongated so that arch portion 62 in nearly flat. Also, cantilevered spring portion 64 is further deflected towards leaf spring portion 60 so that spring 36 is nearly fully compressed.

Second spring engagement surface 89 is itself curved inwardly. Upon release of lid 34 in the open position shown in FIGS. 6 and 7, the spring bias of spring 36 against curved second spring engagement surface 89 of hinge 86, will cause hinge 86 to rotate downwardly to a closed position shown in FIGS. 5 and 8. The relatively strong spring bias against curved second spring engagement surface 89 tends to "snap" the lid closed upon release.

Cover 34 will remain in the closed position shown in FIGS. 5 and 8 until hingedly opened against the bias of spring 36. Further, repeated hinged movement of cover 34 between the open and closed position will be permitted without permanent spring deformation by the unique structure of the spring of the present invention.

Various changes to the foregoing described and shown structures would now be evident to those skilled in the art.

Accordingly, the particularly disclosed scope of the invention is set forth in the following claims.

What is claimed is:

1. An electrical receptacle cover assembly comprising:

a faceplate mountable over an electrical receptacle and having an opening therethrough for exposing an outlet of the receptacle for use;

a cover hingedly attached to said faceplate for closing said opening;

an elongate substantially V-shaped spring positioned on said faceplate;

said faceplate including a means for supporting said elongate spring, said elongate spring being engagable with said cover, said elongate spring further including;

a deformable leaf spring element having a convex shape in an unstressed state and movably supported within said spring support means; and a deformable cantilevered spring element extending from and over said leaf spring element.

2. An electrical receptacle cover assembly of claim 1 wherein said spring supports said cover in a normally closed position and wherein said cover is movable to said open position against the bias of said spring.

3. An electrical receptacle cover assembly of claim 1 wherein said leaf spring element is deformable in a longitudinal direction.

4. An electrical receptacle cover assembly of claim 3 wherein said spring support means includes an elongate trough supporting said leaf spring element said trough having upstanding end walls spaced a given distance, said leaf spring element having a longitudinal dimension in a non-deformed state which is less than said given distance thereby permitting longitudinal deformation of said leaf spring element within said trough.

5. An electrical receptacle cover assembly of claim 3 wherein said cover includes a hinge and said faceplate includes a hinge support means for supporting said hinge therein.

6. An electrical receptacle cover assembly of claim 5 wherein said hinge includes a hinge pin and said hinge support means includes a seat portion for rotatably seating said hinge pin therein.

7. An electrical receptacle cover assembly of claim 6 wherein said hinge includes a spring engaging surface for engagement with said cantilevered spring element.

8. An electrical receptacle cover assembly of claim 7 wherein said spring engagement surface includes a first location engagable with said cantilevered spring element in said closed position and a second location spaced from said first location and engagable with said cantilevered spring element in said open position.

9. An electrical receptacle cover assembly of claim 8 wherein the distance from said hinge pin to said first location is less than the distance from said hinge pin to said second location.

10. An electrical receptacle cover assembly of claim 9 further including a weather-tight gasket secured to said faceplate for positioning adjacent said receptacle outlet.

11. An electrical receptacle cover assembly of claim 10 wherein said gasket includes a gasket member secured to said cover.

12. A cover assembly for an electrical receptacle comprising:

a cover plate positionable over said electrical receptacle, said cover plate having an opening for accessing said receptacle;

a movable lid positionable adjacent said opening;

a lid receiving member on said cover plate, a lid projection insertable into said lid receiving member; and spring means for urging said lid projection under the separate bias of two springs into said lid receiving means and for movably securing said lid to said cover plate, said spring means further movably supporting said lid for movement between a first position wherein said lid covers said opening and a second position wherein said lid uncovers said opening, said spring means is a substantially V-shaped member including:

a leaf spring element having a convex shape in an unstressed state, and a cantilevered spring element extending from said leaf spring element.

13. A cover assembly of claim 12 wherein said leaf spring element and said cantilevered spring element are integrally formed.

14. A cover assembly of claim 12 wherein said leaf spring element is positionable within said lid receiving member, and said cantilevered spring element extends from said leaf spring element for engagement with said lid.

15. A cover assembly of claim 14 wherein said leaf spring element and said cantilevered spring element are integrally formed.

16. A cover assembly of claim 15 wherein said lid receiving member includes a pair of spaced apart guide tracks and said lid projection includes a pair of oppositely directed guide pins insertable into said guide tracks to permit insertion of said lid projection into said lid receiving member, said lid projection being rotatable within said guide tracks to permit hinged movement of said lid with respect to said cover plate between said first and second positions.

17. A cover assembly of claim 12, wherein said cantilever spring element engages said lid.

18. A cover assembly of claim 12, wherein said cantilevered spring element is connected to said leaf spring element by a reversely bent portion disposed therebetween.

19. A cover assembly for an electrical receptacle comprising:

a cover plate positionable over said electrical receptacle, said cover plate having an opening for accessing said receptacle;

a movable lid hingedly attached to said cover plate and being positionable adjacent said opening; and a spring means engagable with said lid and biasing said lid toward a closed position, such that said opening is covered by said lid, said spring means including a first and second spring element, and said first and second spring elements are integrally formed into a substantially V-shaped spring member.

20. A cover assembly for an electrical receptacle of claim 19, wherein said first spring element is an arcuate shaped leaf spring, and said second spring element extends from and over said first spring element forming a cantilevered spring element having a distal end that is unsupported by said spring means.

21. A cover assembly for an electrical receptacle of claim 20, wherein said second spring element engages said lid.

* * * * *